(12) United States Patent
Olesen

(10) Patent No.: US 8,814,514 B2
(45) Date of Patent: Aug. 26, 2014

(54) EMBEDDED FIBRE OPTIC SENSOR FOR WIND TURBINE COMPONENTS

(75) Inventor: Ib Olesen, Aarhus N (DK)

(73) Assignee: Vestas Wind Systems A/S, Aarus N. (DK)

( * ) Notice: Subject to any disclaimer, the term of this patent is extended or adjusted under 35 U.S.C. 154(b) by 525 days.

(21) Appl. No.: 13/002,183

(22) PCT Filed: Jul. 3, 2009

(86) PCT No.: PCT/IB2009/006487
§ 371 (c)(1),
(2), (4) Date: Feb. 4, 2011

(87) PCT Pub. No.: WO2010/001255
PCT Pub. Date: Jan. 7, 2010

(65) Prior Publication Data
US 2011/0135476 A1    Jun. 9, 2011

Related U.S. Application Data

(60) Provisional application No. 61/133,909, filed on Jul. 3, 2008.

(30) Foreign Application Priority Data
Jul. 3, 2008   (GB) .................................. 0812258.2

(51) Int. Cl.
*F03D 11/00*   (2006.01)

(52) U.S. Cl.
USPC .......................................................... 416/61

(58) Field of Classification Search
USPC ................. 415/118; 416/61, 62; 385/12, 13; 73/795, 800; 356/32, 33, 34, 35, 35.5; 702/33, 34, 35, 36, 40, 41, 42, 43
See application file for complete search history.

(56) References Cited

U.S. PATENT DOCUMENTS 3,602,866 A * 8/1971 Saxl .................................. 338/5
3,621,437 A * 11/1971 Mading ............................. 338/5
(Continued)

FOREIGN PATENT DOCUMENTS

DE    31 06 624    9/1982
DE    31 48 867    6/1983
(Continued)

OTHER PUBLICATIONS

David Biloen; International Preliminary Report on Patentability issued in International Application No. PCT/IB2009/007018; Mar. 7, 2011; 9 pages; European Patent Office.

(Continued)

*Primary Examiner* — Nathaniel Wiehe
*Assistant Examiner* — Adam W Brown
(74) *Attorney, Agent, or Firm* — Patterson & Sheridan, LLP

(57) ABSTRACT

A fiber optic sensor is embedded in an integral housing block formed by molding or extrusion. The housing block has a mounting surface for attachment to a wind turbine component by adhesive or mechanical connection. In an arrangement where the sensor is to be isolated from strains on the component, the housing block may be mounted on the component by means of a smaller mounting portion, joining the mounting portion at a neck region.

16 Claims, 3 Drawing Sheets

(56) References Cited

U.S. PATENT DOCUMENTS

| | | | |
|---|---|---|---|
| 4,387,993 A | 6/1983 | Adrian | |
| 4,414,471 A * | 11/1983 | Rines | 250/227.14 |
| 4,671,659 A | 6/1987 | Rempt et al. | |
| 4,912,530 A | 3/1990 | Bessho | |
| 4,996,419 A | 2/1991 | Morey | |
| 5,009,505 A | 4/1991 | Malvern | |
| 5,067,786 A * | 11/1991 | Hawkins et al. | 385/13 |
| 5,094,527 A | 3/1992 | Martin | |
| 5,160,976 A | 11/1992 | Carr et al. | |
| 5,201,015 A | 4/1993 | von Bieren et al. | |
| 5,250,802 A | 10/1993 | Runner | |
| 5,308,973 A | 5/1994 | Odoni et al. | |
| 5,488,475 A | 1/1996 | Friebele et al. | |
| 5,633,748 A | 5/1997 | Perez et al. | |
| 5,649,035 A * | 7/1997 | Zimmerman et al. | 385/13 |
| 5,726,744 A | 3/1998 | Ferdinand et al. | |
| 5,973,317 A | 10/1999 | Hay | |
| 6,125,216 A | 9/2000 | Haran et al. | |
| 6,301,968 B1 | 10/2001 | Maruyama et al. | |
| 6,586,722 B1 | 7/2003 | Kenny et al. | |
| 6,640,647 B1 | 11/2003 | Hong et al. | |
| 6,834,552 B1 * | 12/2004 | Thorsen | 73/800 |
| 6,845,326 B1 * | 1/2005 | Panigrahi et al. | 702/22 |
| 7,086,834 B2 | 8/2006 | LeMieux | |
| 7,703,331 B2 | 4/2010 | Magne et al. | |
| 2002/0057436 A1 | 5/2002 | Skinner et al. | |
| 2003/0012511 A1 * | 1/2003 | Lin et al. | 385/51 |
| 2003/0066356 A1 * | 4/2003 | Kanellopoulos et al. | 73/800 |
| 2003/0127587 A1 | 7/2003 | Udd et al. | |
| 2003/0150276 A1 * | 8/2003 | Christensen et al. | 73/795 |
| 2004/0057828 A1 | 3/2004 | Bosche | |
| 2004/0114850 A1 | 6/2004 | Dewyntermarty et al. | |
| 2005/0088660 A1 | 4/2005 | Ronnekleiv | |
| 2005/0276696 A1 | 12/2005 | LeMieux | |
| 2006/0146337 A1 | 7/2006 | Hartog | |
| 2006/0285813 A1 | 12/2006 | Ferguson | |
| 2007/0003182 A1 * | 1/2007 | Hunn | 385/12 |
| 2007/0223004 A1 | 9/2007 | Baillon et al. | |
| 2007/0280582 A1 | 12/2007 | Sanders | |
| 2007/0284112 A1 | 12/2007 | Magne et al. | |
| 2008/0013879 A1 | 1/2008 | Mossman | |
| 2008/0317598 A1 | 12/2008 | Barbu et al. | |
| 2009/0097976 A1 | 4/2009 | Driver et al. | |

FOREIGN PATENT DOCUMENTS

| | | |
|---|---|---|
| DE | 195 24 036 | 7/1996 |
| DE | 253 669 | 1/1998 |
| DE | 199 23 087 | 12/2000 |
| DE | 199 27 015 | 12/2000 |
| DE | 202 06 704 | 8/2002 |
| DE | 101 60 522 | 6/2003 |
| DE | 103 15 676 | 11/2004 |
| EP | 0 640 824 | 3/1995 |
| EP | 0 857 291 | 5/1997 |
| EP | 0 984 243 | 3/2000 |
| EP | 1 148 324 | 10/2001 |
| EP | 1 249 692 | 10/2002 |
| EP | 1 359 321 | 11/2003 |
| EP | 1 466 827 | 10/2004 |
| EP | 1 586 854 | 10/2005 |
| EP | 1 770 278 | 4/2007 |
| EP | 1 780 523 | 5/2007 |
| EP | 1 873 395 | 1/2008 |
| EP | 1 911 968 | 4/2008 |
| EP | 2 025 929 | 2/2009 |
| EP | 2 075 462 | 7/2009 |
| FR | 2 707 754 | 1/1995 |
| GB | 2 105 846 | 3/1983 |
| GB | 2 284 256 | 5/1995 |
| GB | 2 326 471 | 12/1998 |
| GB | 2 398 841 | 9/2004 |
| GB | 2 409 517 | 6/2005 |
| GB | 2 421 075 | 6/2006 |
| GB | 2428748 | 2/2007 |
| GB | 2 440 953 | 2/2008 |
| GB | 2 440 954 | 2/2008 |
| GB | 2 440 955 | 2/2008 |
| GB | 2466433 | 6/2010 |
| JP | 55-69006 | 5/1980 |
| JP | 58-153107 | 9/1983 |
| JP | 60-100707 | 6/1985 |
| JP | 1069922 | 3/1989 |
| JP | 6-117914 | 4/1994 |
| JP | 2000-111319 | 4/2000 |
| JP | 2003-302536 | 10/2003 |
| JP | 2007-114072 | 5/2007 |
| LV | 11378 | 8/1996 |
| LV | 11389 | 8/1996 |
| RU | 780 654 | 3/1996 |
| RU | 577394 | 10/1997 |
| WO | 97/15805 | 5/1997 |
| WO | 00/23764 | 4/2000 |
| WO | 00/28294 | 5/2000 |
| WO | 00/39548 | 7/2000 |
| WO | 01/33075 | 5/2001 |
| WO | 02/053910 | 7/2002 |
| WO | 03/076887 | 9/2003 |
| WO | WO 03076887 A1 * | 9/2003 |
| WO | 2005/024349 | 3/2005 |
| WO | 2005/071382 | 8/2005 |
| WO | 2005/071383 | 8/2005 |
| WO | 2006/021751 | 3/2006 |
| WO | 2006/063990 | 6/2006 |
| WO | 2007/099290 | 9/2007 |
| WO | 2007/104306 | 9/2007 |
| WO | 2008/101496 | 8/2008 |
| WO | WO 2008101496 A2 * | 8/2008 |
| WO | 2009/046717 | 4/2009 |

OTHER PUBLICATIONS

Christoph Felicette; International Search Report and Written Opinion issued in International Application No. PCT/EP2009/008934; Apr. 27, 2010; 11 pages; European Patent Office.

Jonathan Charles Teixeira Moffat; Office Action issued in U.S. Appl. No. 13/119,871; Jun. 30, 2011; 23 pages; U.S. Patent and Trademark Office.

Jonathan Charles Teixeira Moffat; Office Action issued in U.S. Appl. No. 13/119,871; Dec. 13, 2011; 18 pages; U.S. Patent and Trademark Office.

Gareth John; Search Report issued in Great Britain Application No. GB0812037.0; Sep. 16, 2008; 4 pages; Great Britain Intellectual Property Office.

P. Ganci; International Search Report issued in International Application No. PCT/GB96/02606; Jan. 28, 1997; 2 pages; European Patent Office.

Robert MacDonald; Combined Search and Examination Report issued in Great Britain Application No. GB0812258.2; Nov. 7, 2008; 6 pages; Great Britain Intellectual Property Office.

Christopher Smith; Search Report issued in Great Britain Application No. GB0814651.6; Dec. 4, 2008; 1 page; Great Britain intellectual Property Office.

Tony Oldershaw; Examination Report issued in Great Britain Application No. GB0814651.6; May 1, 2009; 2 pages; Great Britain Intellectual Property Office.

Tony Oldershaw; Combined Search and Examination Report issued in Great Britain Application No. GB0817341.1; Jan. 12, 2009; 4 pages; Great Britain Intellectual Property Office.

David Biloen; International Search Report and Written Opinion issued in International Application No. PCT/IB2009/007018; Oct. 7, 2010; 6 pages; European Patent Office.

Lars Jakobsson; International Search Report issued in International Application No. PCT/NO03/00087; Jun. 10, 2003; 3 pages; European Patent Office.

(56) References Cited

OTHER PUBLICATIONS

Tony Oldershaw; Combined Search and Examination Report issued in Great Britain Application No. GB0822930.4; Mar. 26, 2009; 5 pages; Great Britain Intellectual Property Office.

James Paddock; Combined Search and Examination Report issued in Great Britain Application No. GB0913739.9; Nov. 30, 2009; 4 pages; Great Britain Intellectual Property Office.

Daniel Jones; Combined Search and Examination Report issued in Great Britain Application No. GB1004162.2; Sep. 13, 2010; 8 pages; Great Britain Intellectual Property Office.

Mike Walker; Combined Search and Examination Report issued in Great Britain Application No. GB1001855.4; Mar. 22, 2010; 7 pages; Great Britain Intellectual Property Office.

\* cited by examiner

EMBEDDED FIBRE OPTIC SENSOR FOR WIND TURBINE COMPONENTS

PRIORITY CLAIMS

The present application claims priority to international patent application PCT/IB2009/006487 filed Jul. 3, 2009, entitled "Embedded Fibre Optic Sensor For Wind Turbine Components," which claims priority to both U.S. Provisional Patent Application Ser. No. 61/133,909 filed Jul. 3, 2008, entitled "Embedded Fibre Optic Sensor For Wind Turbine Components And Method For Producing Same," and also to Great Britain Patent Application GB 0812258.2 filed Jul. 3, 2008, entitled "Embedded Fibre Optic Sensor For Wind Turbine Components And Method For Producing Same."

BACKGROUND OF THE INVENTION

The invention relates to a fibre optic sensor for attachment to a wind turbine component, and in particular to a fibre optic sensor having a mounting portion to facilitate attachment and isolate the fibre optic sensor from strain.

Wind turbine components are subject to deformation or strain from a number of sources, such as the accumulation of particulates like dirt or ice, their own weight, and the force exerted by the wind itself. Consequently, it is important that the strain on components be monitored to ensure that they remain fit to operate over their intended working lives.

One way of measuring the strain on wind turbine components involves using Fibre Bragg Grating (FBG) sensors, such as those described in patent applications GB 4640953, GB 4640954 and GB 4640955.

An FBG sensor is an optical fibre in which an optical grating is formed. The grating itself is typically a periodic variation in the refractive index of the fibre, tuned to reflect a particular wavelength of light. The part of the optical fibre having the grating is then attached to the region of the wind turbine component where the strain is to be measured. It is attached in such a way that any deformation or strain experienced by the component is transmitted to the fibre and to the grating. Deformation and strain causes the spacing of the grating to change, and causes a detectable change in the wavelength of light reflected back or transmitted by the grating. Various arrangements are known for inserting light into the FBG sensors and for extracting and analysing the output.

Manufacturing an FBG sensor involves unwinding a length of optical fibre, and selecting a position in which the grating is to be formed. An opening is formed in the fibre coating, which may be acrylate or polyimide for example, in a procedure known as stripping. The optical grating is then created by photolithography techniques, such as UV pattern exposition. Once the grating has been formed, it may be stabilised, and the opening in the coating is then closed by re-applying and re-curing the acrylate or polyimide as appropriate. Finally, the position of the FBG is marked on the fibre for reference. This can be a costly process.

Interferometric techniques are also known for measuring strain using optical fibres, such as described in the paper entitled "Fatigue strength of glass reinforced polyester (GRP) laminates with embedded optical fibres" by Alfredo Guemes and Jose M Menendez, published at the Third ICIM/ECSSM '96 at Lyon, ISBN 0-8194-2165-0/96. Such techniques do not make use of Fibre Bragg Gratings, but instead use the interference of light travelling different optical paths the fibre optic of the sensor.

A number of techniques for mounting fibre optic sensors on wind turbine components are known, such as attaching the fibre optic cable by means of brackets, or hollow casings, or locating the sensor within a capillary tube that can be embedded, tube and all, in a composite material. When attaching a fibre optic sensor, it is important that the sensor will not damaged by the mounting means, either when the cable is mounted or later during the operational life of the sensor. However, for strain sensors, it is also important that the sensor be sufficiently sensitive to strain on the component.

Optic fibres may also be used to compensate for environmental conditions, such as temperature, that could affect the main sensor measurement. In a strain sensor for example, the temperature sensitive changes in the optical characteristics of a secondary optic fibre that is isolated from strain on the wind turbine component can be used to correct for similar temperature sensitive changes in the strain sensing fibre. Such secondary optical fibres should be mounted securely to the wind turbine component, and be adequately isolated from strain on the component.

We have appreciated that there is a need for a more robust method of producing and mounting fibre optic sensors on wind turbine components, and for ensuring that fibre optic strain sensors are mounted to make useful measurements of the strain on the wind turbine component.

SUMMARY OF THE INVENTION

According to the invention in a first aspect, there is provided a fibre optic sensor for a wind turbine component, comprising: an optical fibre; a light source for feeding light into the optical fibre; and a light detector for detecting light that has travelled along the fibre; a housing block for isolating the fibre optic sensor from strain on the wind turbine component, the housing block comprising: a housing portion in which the optical fibre is embedded and through which the optical fibre passes; and a single mounting portion having a mounting surface for mounting the sensor on the wind turbine component; wherein the housing portion and the mounting portion are connected at a neck portion, and the thickness of the mounting portion spaces the housing portion away from the wind turbine component.

The separation of the mounting portion and the housing portion via the neck portion means that the strain exerted on the mounting portion when it is attached to the wind turbine component, either by a mechanical fastener or adhesive is not readily transmitted to the housing portion. The housing portion in turn provides protection for the optical fibre sensor embedded inside, against environmental conditions, shocks, and other factors that may cause damage. It also provides a secure mount for easy attachment of the sensor to the turbine component.

By spacing the housing portion away from the component by means of the single mounting portion and neck portion, the housing portion is at least partly isolated from deformation or strain on the component, and can operate as a non-strain sensor. Further, the spacing of the housing portion away from the component essentially immobilises the housing portion and prevents movement relative to the component. Such movement would result in shocks and spurious strain measurements.

In one embodiment, the neck portion is an area of overlap between the housing portion and the mounting portion having a small area compared with the surface area of the housing portion. This reduces the available area for strain to be transmitted to the housing portion from the mounting portion.

In an alternative embodiment, the neck portion extends between the housing portion and the mounting portion. This further spaces the housing portion away from the wind turbine component, and allows the neck portion to be stiffened to further isolate the housing portion from strain. In this case, the neck portion may be provided with a cross section that is much smaller than the housing portion and mounting portion between which it extends, and may for example have a stiffened tubular shape.

Preferably, the neck portion is then stiffened such that any deformation of the mounting portion is further isolated form the housing portion.

Advantageously, the housing portion is stiffened such that when mounted on a rotating wind turbine component it is substantially unaffected by strain resulting from the effects of gravity or of the kinetic energy of the rotation. This increases the isolation of the sensor and therefore increases accuracy.

In another embodiment the housing portion is substantially stiffer than the mounting portion such that transmission of strain between the portions is reduced. This means that any deformation or strain of the wind turbine component is largely dissipated in the more flexible mounting portion.

Advantageously, the optical fibre is embedded in the housing fibre portion in a curved arrangement, such that it is substantially not more sensitive to strain in one direction than in another. This increases the likelihood that the sensor will not be significantly affected by any strain experienced in the housing portion therefore increasing sensor accuracy.

The optical fibre may for example be curved in a path substantially following the arc of a circle for more than $\frac{1}{2}\pi$ radians. This ensures that strain is not felt preferentially in any one direction.

Preferably, the housing portion is larger than the mounting portion. This means that the optical fibre in the housing portion is better shielded from strain on the component, by the smaller mounting portion and the small shoulder, and allows the optical fibre to be easily accommodated.

In one aspect, the mounting portion is located entirely underneath the housing portion allowing mounting space to be preserved.

In one aspect, the mounting portion is arranged to receive a mechanical fastener by which the mounting portion can be attached to the surface of the wind turbine component. By separating the location at which the fastener is connected from the housing portion in which the fibre is mounted, the effect of mounting stresses on the housing portion can also be reduced.

BRIEF DESCRIPTION OF THE DRAWINGS

Examples of the invention will now be described, by way of example, and with reference to the drawings in which.

DETAILED DESCRIPTION

Figure 1:
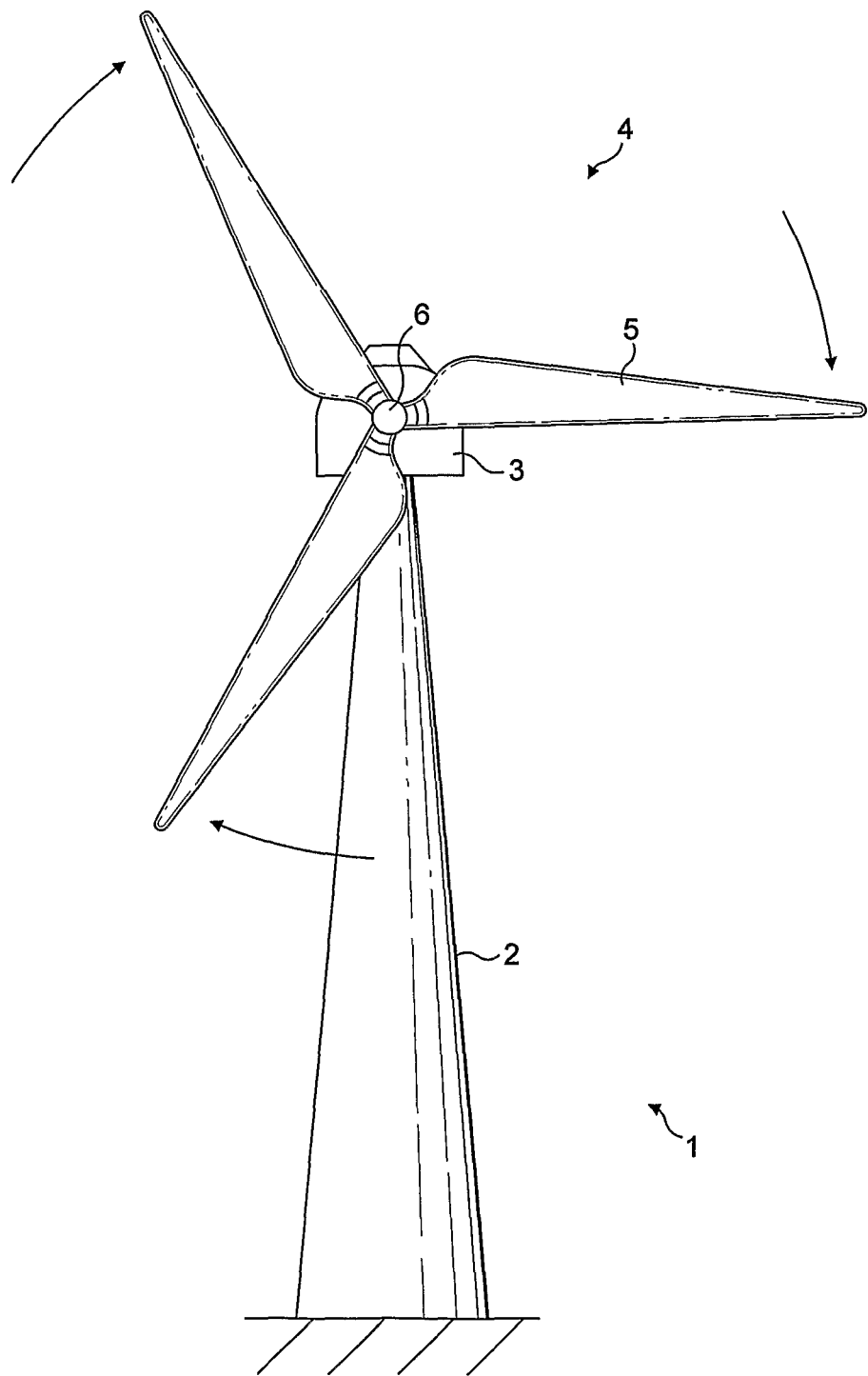
FIG. 1 illustrates a known wind turbine.

FIG. 1 illustrates a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended from domestic or light utility usage, or may be a large model used, such as those that are suitable for use in large scale electricity generation on a wind farm for example. In the latter case, the diameter of the blades could be as large as 100 meters or more. It will be appreciated that the sensor described below could be attached to the inside or outside of any or all of the components described.

Figure 2:
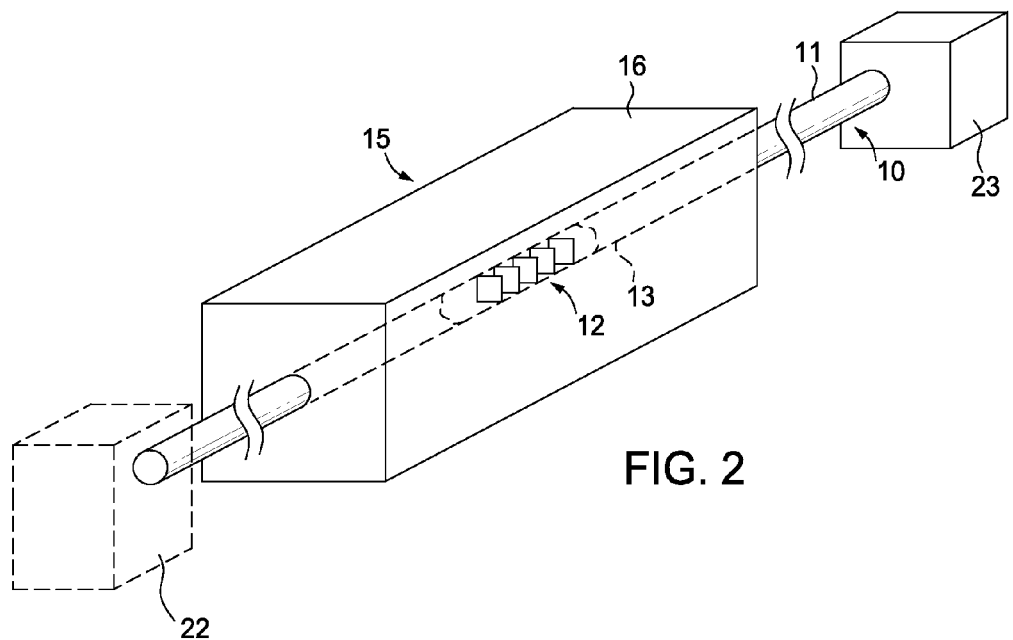
FIG. 2 illustrates a first example sensor mounting.

FIG. 2 shows a first example sensor. A fibre optic cable 10 having a coating 11 passes through integrally formed solid housing block 15. The housing block has a surface 16 shaped for mounting on a wind turbine component. Based on its desired point of attachment, the surface may be flat, or curved. If it is to be attached to the component via adhesive, the surface may also comprise small features such as stipples, or grooves to increase the surface area for the adhesive to act. It will be appreciated that the housing block may be relatively large in comparison to the cross sectional dimension of the fibre, in cross section, or at least one lateral dimension. A light source 22 for feeding light into the optical fibre 10 and a light detector 23 for detecting light that has travelled along the optical fibre 10 are shown in FIG. 2. Control circuitry is not shown in FIG. 2, but will be part of any operational sensor. Use of adhesive is advantageous as it avoids introducing mounting stress in the sensor from attachment via bolts.

The housing may be made from a polymer material, such as polyester, vinyl ester, nylon, epoxy, or resin. It may also comprise and may additionally include reinforcing fibres such as glass or carbon. The housing block may be made of similar material to the turbine component on which it is mounted. Where the housing block is to be attached to the component by means other than adhesive, portions for receiving bolts or screws can be formed into the portion.

The fibre may comprise a Fibre Bragg Grating 12 positioned so that it is entirely enclosed within the integral housing block 15. As the polymer or resin material surrounds and is contiguous with the region of the fibre in which the FBG is formed, it is not necessary during production to recoat the fibre after formation of the grating. Thus, the coating 11 of the fibre may remain exposed at the site of the FBG to provide a window 13 in the coating.

Thus, a method of producing the sensor illustrated in FIG. 2 can omit the recoating step that is typically required to protect the fibre and ensure it operates correctly. A method for constructing a sensor would therefore involve: removing the coating from an optical fibre; manufacturing a Bragg grating inside the fibre using a suitable technique such as photolithography; embedding at least a portion of the fibre optic cable in the housing block with the Fibre Bragg Grating enclosed in the housing; and mounting the housing on the wind turbine component directly.

Alternatively, the sensor may omit the grating, and in operation use alternative techniques such as interferometry.

Manufacture of the integral housing block and embedding the optical fibre can be by any suitable technique, such as by moulding or extrusion processes. A suitable mould could for example be made of materials such as fiberglass or aluminium and be provided as two mating halves, defining the shape of the housing material, and having an outlet for the fiberglass cable to extend from the mould during production of the housing block. The moulding process could further make use of vacuum induction or infusion to draw the polymer or resin into the mould.

Alternatively, the moulding process may involve a vacuum bag system in which one side of the mould is flexible, and the resin or polymer is drawn into the mould by the action of the vacuum. Having one side of the mould as a flexible part allows the optical fibre to be handled more easily and without damage during the moulding process, and allows the hard portion of the mould to impart a well defined surface shape to the housing block.

In extrusion techniques a die can be used to impart the desired cross sectional shape to the moulding portion, as resin and fibre are passed through the die.

It is important that the housing block has similar thermal expansion characteristics as the component to which it is attached, so that it does not deform or buckle as the temperature changes.

The example of FIG. 2 is useful in that the housing block transmits strain on the component, experienced over the mounting surface, to the FBG sensor. However, in operation the sensor may still be more sensitive to the region of the component located directly adjacent to the grating itself, namely over a length of 20 to 30 mm.

Figure 3:
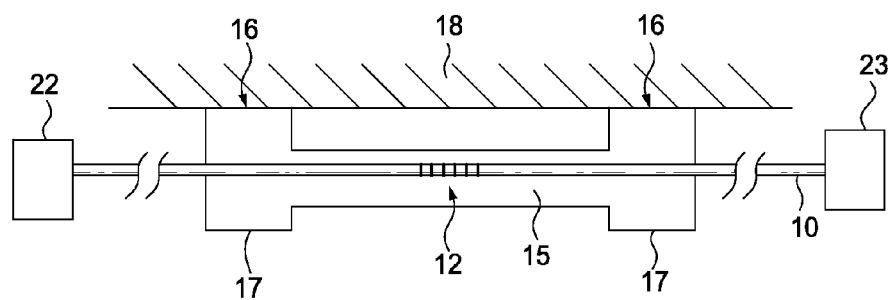
FIG. 3 illustrates a second example sensor mounting.

FIG. 3 therefore shows a housing block and sensor configuration for detecting strain over a larger part of the surface, such as an area having a length dimension of 100 to 200 mm, or more.

The arrangement is similar to that of FIG. 2, except that the housing block 15 now has two end or terminal sections 17 at either end of its central section. The terminal sections provide the mounting surface 16 for connecting the housing block 15 to the surface 18 of the turbine component the strain of which is being measured, but are slightly larger than the central section of the housing block 15 and provide clearance or separation between the central section of the housing block 15 and the surface.

Thus, the spaced mounting surfaces 16 receive the strain at the surface 18, rather than the area under the FBG which, as before, is positioned in the portion 15, and transmit this to the entire length of the fibre optic cable and the FBG.

As the intermediate portion of the housing block is not in direct contact with the wind turbine component when the sensor is mounted, it will be stretched uniformly when the distance between the two measuring parts 17 changes. This gives a more reliable measurement, compared with the more traditional spot like measurements of known sensors.

The spacing of the two end portions or section is therefore preferably 30 mm or more, and even more advantageously in the range 100 mm to 200 mm. Depending on the implementation sensors larger than in this range are also possible, for example 1 m or more. Sensors having the thin central section 15 and the larger terminal sections 17 are preferably manufactured as one integral component, but may also be made in sections and attached to each other with suitable adhesive.

It will be appreciated that the end sections could be any shape as long as they provide a gap between the section of the housing containing the FBG and the surface. As a single fibre cable sensor may also comprise a plurality of gratings, it may be appropriate to provide a plurality of connection sections 17, in a spaced configuration resembling one or more legs and not just at the end of the housing to separate respective portions of the housing containing respective FBGs from the surface 18.

There may be a need to attach to the wind turbine component an FBG sensor that is isolated from strain on the component. Such sensors may be used as a reference sensor to allow for environmental factors, like temperature, to be taken into account when using an associated strain measurement sensor. Such sensors also allow movement and gravity effects to be compensated.

Figure 4:
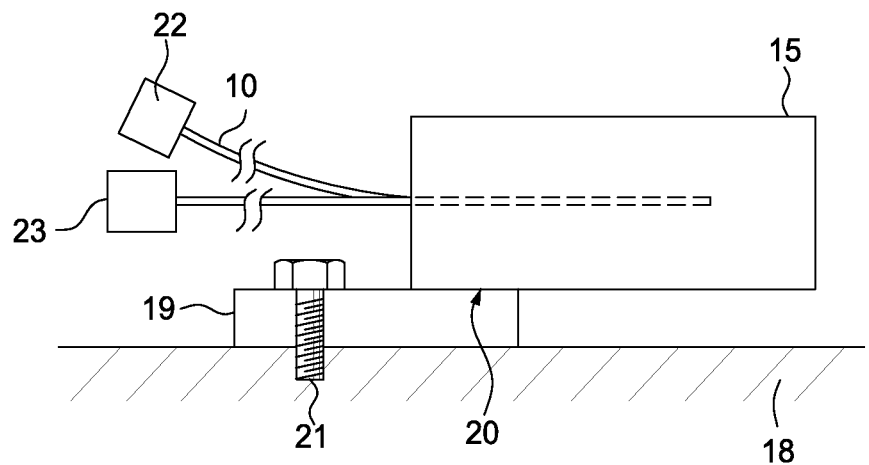
FIG. 4 illustrates a lateral view of an example implementation of the invention.
Figure 5:
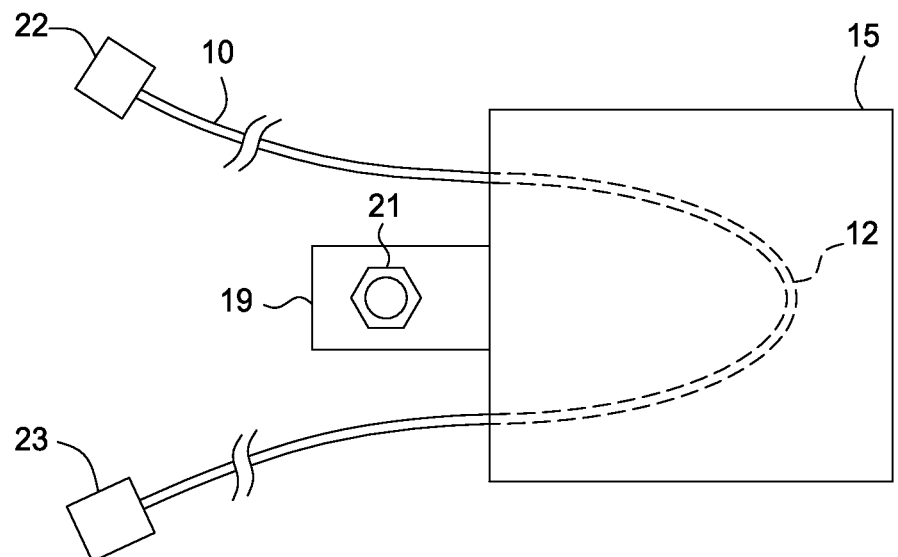
FIG. 5 illustrates a top view of an example implementation of the invention.

FIGS. 4 and 5 illustrate an example implementation of the invention for mounting such a sensor on the wind turbine component. It is preferably mounted close to the strain measurement sensor so that it is subject to the same environmental conditions. The FBG sensor is formed in housing block 15 in the same way as explained above for FIG. 2. In this example, the fibre in the housing sensor may be curved in the housing block so that it does not extend substantially more in one direction than in another, and as a result is not susceptible to strain in any particular direction. A suitable curved path for the optical fibre is to substantially follow the arc of a circle for $\frac{1}{2}\pi$ radians or more, as this ensures that the fibre is not susceptible to strain in any one preferred direction, as would be the case if the fibre were straight. Multiples of $\frac{1}{2}\pi$ radians are also possible allowing the curved path of the optical fibre to extend in a substantially circular path for as close to $2\pi$ radians as possible. Suitable paths other than circular paths may be used.

The housing or fibre portion 15 is then attached to the component 18 by a separate mounting portion 19. The mounting portion 19 and housing portion 15 are preferably connected solely by a thin shoulder or neck portion 20, so that the housing block 15 is provided with a gap or clearance from the turbine component to which it is attached. It will be appreciated that only a single mounting portion 19 is preferred, as two would be likely to couple strain on the surface into the housing block.

Any strain from mounting the mounting portion on the surface 18, by bolt 21 for example, or from the surface itself, is further isolated from the housing block 15 by the narrow shoulder or neck portion 20. The shoulder or neck portion may be provided at the edge of the housing fibre portion and mounting portion as shown in the figure, so that the two portions only overlap at a region of reduced area. Otherwise, the mounting portion may be provided underneath the housing portion and simply be sufficiently small to decouple the stress on the component from the larger housing portion. The neck portion could extend along the length of both of the mounting and housing portion or be a narrower bottle neck shape.

The neck may also be a separate component extending between the mounting portion and the housing portion. Preferably, the neck portion is stiffened such that any deformation of the mounting portion is substantially isolated form the housing portion.

The mounting portion 19 and the housing block 15 may be provided as a single integral, uniform piece, or may be provided as two separate components and secured with adhesive. Preferably the housing portion is made stiff so that it is more resistant to strain and better isolates the fibre optic cable inside. For example, if the sensor is to be mounted on a rotating wind turbine component it is preferable if the housing portion is stiffened such that it is substantially unaffected by strain resulting from the effects of gravity or of the kinetic energy of the rotation. It may further be appropriate to make the mounting portion less stiff than the housing block 15, and even the turbine component so that the mounting block is relatively flexible (compared to the housing block) and the housing block 15 containing the sensor is better isolated 5.

In all cases, however, the stiffness of the separate portions should be sufficient so that the housing block is unable to move relatively to the wind turbine component on which it is mounted. Such movement would of course result in strain on the housing block and therefore a decrease in sensor accuracy.

A neck or narrow shoulder may be used in the example implementation of FIG. 2, where bolts are used to secure the end connections to the turbine component, to further isolate the sensor from mounting stress. Furthermore, the size of the mounting portion may be made small in comparison to the fibre housing block, to reduce the area of attachment to the component and further isolate the housing fibre portion from stress and strain.

The invention has been described with reference to example implementations, purely for the sake of illustration. The invention is not to be limited by these, as many modifications and variations would occur to the skilled person. The invention is to be understood from the claims that follow.

The invention claimed is:

1. A fibre optic sensor assembly for a wind turbine component, comprising:
   an optical fibre comprising a fibre optic sensor;
   a light source for feeding light into the optical fibre;
   a light detector for detecting the light that has travelled along the optical fibre; and
   a housing block for isolating the fibre optic sensor from strain on a wind turbine component, the housing block comprising:
      a housing portion in which the optical fibre is embedded and through which the optical fibre passes, and
      a single mounting portion comprising a mounting surface for mounting the single mounting portion on the wind turbine component and a second surface opposite the mounting surface, the housing portion is mounted on the second surface of the single mounting portion to form a neck portion, the second surface and the mounting surface are separated by a thickness of the single mounting portion,
   wherein the neck portion connecting the housing portion and the single mounting portion, and the neck portion configured to at least partially isolate the housing portion and the fibre optic sensor disposed within the housing portion from the strain on the wind turbine component.

2. The fibre optic sensor assembly of claim 1, wherein the neck portion is an area of overlap between the housing portion and the single mounting portion having a small area compared with a surface area of the housing portion.

3. The fibre optic sensor assembly of claim 1, wherein the neck portion extends between the housing portion and the single mounting portion.

4. The fibre optic sensor assembly of claim 1, wherein the optical fibre is embedded in the housing portion in a curved arrangement, such that the optical fibre is substantially not more sensitive to strain in one direction than in another.

5. The fibre optic sensor assembly of claim 4, wherein the optical fibre is curved in a path substantially following an arc of a circle for more than $\frac{1}{2}\pi$ radians.

6. The fibre optic sensor assembly of claim 1, wherein the housing portion is larger than the single mounting portion.

7. The fibre optic sensor assembly of claim 1, wherein the single mounting portion is located entirely underneath the housing portion.

8. The fibre optic sensor assembly of claim 1, wherein the single mounting portion is arranged to receive a mechanical fastener by which the single mounting portion can be attached to a surface of the wind turbine component.

9. The fibre optic sensor assembly of claim 1, wherein the optical fibre is free from abutment with the single mounting portion.

10. The fibre optic sensor assembly of claim 1, wherein the housing portion is integral with the single mounting portion as a single uniform piece.

11. The fibre optic sensor assembly of claim 1, wherein the fibre optic sensor comprises a Fibre Bragg Grating disposed entirely within the housing portion.

12. An apparatus, comprising:
   a wind turbine component;
   an optical fibre comprising a fibre optic sensor;
   a light source for feeding light into the optical fibre;
   a light detector for detecting the light that has travelled along the optical fibre; and
   a housing block for isolating the fibre optic sensor from strain on the wind turbine component, the housing block comprising:
      a housing portion in which the optical fibre is embedded and through which the optical fibre passes, and
      a single mounting portion comprising a mounting surface for mounting the single mounting portion on the wind turbine component and a second surface opposite the mounting surface, the housing portion is mounted on the second surface of the single mounting portion to form a neck portion, the second surface and the mounting surface are separated by a thickness of the single mounting portion,
   wherein the neck portion connecting the housing portion and the single mounting portion, and the neck portion configured to at least partially isolate the housing portion and the fibre optic sensor disposed within the housing portion from the strain on the wind turbine component.

13. The apparatus of claim 12, wherein the housing portion is free from abutment with the wind turbine component.

14. The apparatus of claim 12, wherein the thickness of the single mounting portion spaces the housing portion away from the wind turbine component to create a gap formed by the housing portion and the wind turbine component, and the gap is disposed between the fibre optic sensor and the wind turbine component.

15. A wind turbine, comprising:
   a wind turbine tower;
   a wind turbine component;
   an optical fibre comprising a fibre optic sensor;
   a light source for feeding light into the optical fibre;
   a light detector for detecting the light that has travelled along the optical fibre; and
   a housing block for isolating the fibre optic sensor from strain on the wind turbine component, the housing block comprising:
      a housing portion in which the optical fibre is embedded and through which the optical fibre passes, and
      a single mounting portion comprising a mounting surface for mounting the single mounting portion on the wind turbine component and a second surface opposite the mounting surface, the housing portion is mounted on the second surface of the single mounting portion to form a neck portion, the second surface and the mounting surface are separated by a thickness of the single mounting portion,
   wherein the neck portion connecting the housing portion and the single mounting portion, and the neck portion configured to at least partially isolate the housing portion and the fibre optic sensor disposed within the housing portion from the strain on the wind turbine component.

16. The wind turbine of claim 15, wherein the thickness of the single mounting portion is configured to space the housing portion away from the wind turbine component to create a gap formed by the housing portion and the wind turbine component, and the gap is disposed between the fibre optic sensor and the wind turbine component.

* * * * *